(12) United States Patent
Araujo Nieto et al.

(10) Patent No.: US 11,724,572 B2
(45) Date of Patent: Aug. 15, 2023

(54) VEHICLE AIR REGISTER ASSEMBLY

(71) Applicant: Ford Global Technologies, LLC, Dearborn, MI (US)

(72) Inventors: Jorge Araujo Nieto, Calimaya (MX); Jose Luis Trejo Chavez, Mexico City (MX); Julian Luis Peralta Casas, Mexico City (MX); Felipe Mendez Reguera, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 17/083,825

(22) Filed: Oct. 29, 2020

(65) Prior Publication Data
US 2022/0134848 A1    May 5, 2022

(51) Int. Cl.
*B60H 1/34*    (2006.01)
*B60H 1/00*    (2006.01)

(52) U.S. Cl.
CPC ......... *B60H 1/3421* (2013.01); *B60H 1/0065* (2013.01); *B60H 1/00528* (2013.01)

(58) Field of Classification Search
CPC ...... B60H 1/34; B60H 1/3414; B60H 1/3421; B60H 1/3428; B60H 1/3435; B60H 1/0065; B60H 2001/3471; B60H 1/00528
See application file for complete search history.

(56) References Cited

U.S. PATENT DOCUMENTS

| | | | |
|---|---|---|---|
| 5,690,550 A * | 11/1997 | Mikowski | B60H 1/345 454/155 |
| 10,449,836 B2 | 10/2019 | Lee et al. | |
| 2005/0076668 A1 * | 4/2005 | Choi | E04F 17/04 62/426 |
| 2011/0217914 A1 * | 9/2011 | Marutschke | B60H 1/3428 29/428 |
| 2018/0283729 A1 | 10/2018 | Terasawa | |

FOREIGN PATENT DOCUMENTS

| | | | | |
|---|---|---|---|---|
| FR | 2768371 A1 * | 3/1999 | | B60H 1/3421 |
| JP | 2017159876 A | 9/2017 | | |
| JP | 2018065506 A | 4/2018 | | |
| KR | 20060009183 A | 1/2006 | | |
| WO | WO-2019202224 A1 * | 10/2019 | | B60H 1/3421 |

* cited by examiner

*Primary Examiner* — Edelmira Bosques
*Assistant Examiner* — Brett Peterson Mallon
(74) *Attorney, Agent, or Firm* — Vichit Chea; Price Heneveld LLP

(57) ABSTRACT

An air register assembly includes a barrel having first and second sides extending between third and fourth sides. A first retainer is disposed adjacent to the third side. A second retainer is disposed adjacent to the fourth side. A support feature extends between the first and second sides of the barrel. The support feature includes a first vane member extending from the first connector, a second vane member extending from the second connector and toward the first vane member, and a linking member extending between the first and second vane members.

18 Claims, 10 Drawing Sheets

VEHICLE AIR REGISTER ASSEMBLY

FIELD OF THE DISCLOSURE

The present disclosure generally relates to an air register assembly. More specifically, the present disclosure relates to an air register assembly for a vehicle.

BACKGROUND OF THE DISCLOSURE

Vehicles generally have air vents for directing air into a passenger cabin of the vehicle. The air vents may be adjustable to direct airflow in different directions into the passenger cabin.

SUMMARY OF THE DISCLOSURE

According to at least one aspect of the present disclosure, a vehicle air register assembly includes a housing defining an outlet. An outer barrel is operably coupled to the housing proximate the outlet. The outer barrel includes first and second sides extending between third and fourth sides. Each of the first and second sides defines an aperture. A first retainer is disposed adjacent to an inner surface of the third side of the outer barrel. A second retainer is disposed adjacent to the inner surface of the fourth side of the outer barrel. Vanes are pivotally coupled to the first and second retainers. A support feature has a first connector spaced from a second connector. The first connector includes a snap feature that engages the aperture defined by the first side of the outer barrel, and the second connector includes a snap feature that engages the aperture defined by the second side of the outer barrel. Each of the first and second connectors engages the first and second retainers to define an inner barrel.

According to another aspect of the present disclosure, an air register assembly includes a barrel having first and second sides extending between third and fourth sides. A first retainer is disposed adjacent to the third side. A second retainer is disposed adjacent to the fourth side. Vanes extend between the first and second retainers. A knob assembly is operably coupled to at least one of the vanes. A support feature extends between the first and second sides. The support feature includes a first connector that extends between the first and second retainers adjacent to the first side of the barrel and a second connector that extends between the first and second retainers adjacent to the second side of the barrel. The support feature includes a U-shaped linking member disposed proximate the knob assembly.

According to another aspect of the present disclosure, an air register assembly includes a barrel having first and second sides extending between third and fourth sides. A first retainer is disposed adjacent to the third side. A second retainer is disposed adjacent to the fourth side. A support feature extends between the first and second sides of the barrel. The support feature includes a first connector that engages the first side of the barrel and a second connector that engages the second side of the barrel. The support feature includes a first vane member extending from the first connector, a second vane member extending from the second connector and toward the first vane member, and a linking member extending between the first and second vane members.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
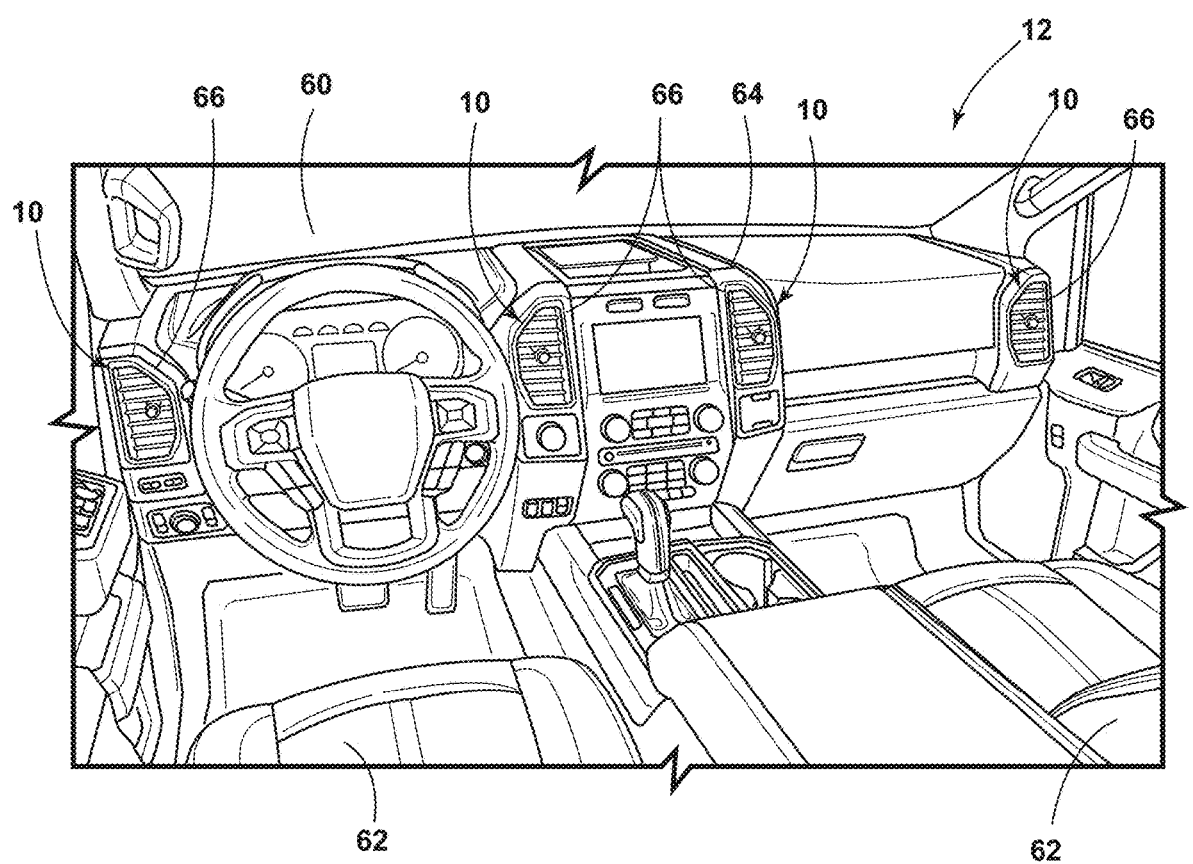
FIG. 1 is a front perspective view of a dashboard within an interior compartment of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-12, reference numeral 10 generally designates an air register assembly for a vehicle 12. A housing 14 defines an outlet 16. An outer barrel 18 is operably coupled to the housing 14 proximate the outlet 16. The outer barrel 18 includes first and second sides 20, 22 that extend between third and fourth sides 24, 26. Each of the first and second sides 20, 22 defines an aperture 28. A first retainer 30 is disposed adjacent to an inner surface 32 of the third side 24 of the outer barrel 18. A second retainer 34 is disposed adjacent to the inner surface 32 of the fourth side 26 of the outer barrel 18. Vanes 36 are pivotally coupled to the first and second retainers 30, 34. A support feature 38 has a first connector 40 spaced from a second connector 42. The first connector 40 and the second connector 42 each include a snap feature 44. The snap feature 44 of the first connector 40 engages the aperture 28 on the first side 20 of the outer barrel 18, and the snap feature 44 on the second connector 42 engages the aperture 28 on the second side 22 of the outer barrel 18. Each of the first and second connectors 40, 42 engage the first and second retainers 30, 34 to define an inner barrel 46.

Referring to FIG. 1, the vehicle 12 includes an interior compartment 60 that includes seating assemblies 62 for supporting passengers of the vehicle 12. An instrument panel or a dashboard 64 extends in a cross-car direction in a vehicle-forward portion of the interior compartment 60 proximate the seating assemblies 62. The dashboard 64 defines air vent openings 66 that fluidly couple the interior compartment 60 with a heating, ventilation, and air conditioning (HVAC) system for the vehicle 12. The vehicle 12 generally includes multiple air register assemblies 10, with at least one air register assembly 10 disposed in each air vent opening 66 to direct airflow from the HVAC system. The HVAC system generally cleans, cools, heats, regulates, ventilates, and/or dehumidifies air directed into the interior compartment 60. The vehicle 12 may be a sedan, a sport utility vehicle, a van, a truck, a crossover, other styles of wheeled motor vehicles 12, or other types of vehicles 12. The vehicle 12 may be a manually operated vehicle 12 (e.g., with a human driver), a fully autonomous vehicle 12 (e.g., with no human driver), or a partially autonomous vehicle 12 (e.g., operated with or without a human driver). Additionally, the vehicle 12 may be utilized for personal and/or commercial purposes, such as, for ride-providing services (e.g., chauffeuring) or ride-sharing services.

Figure 2:
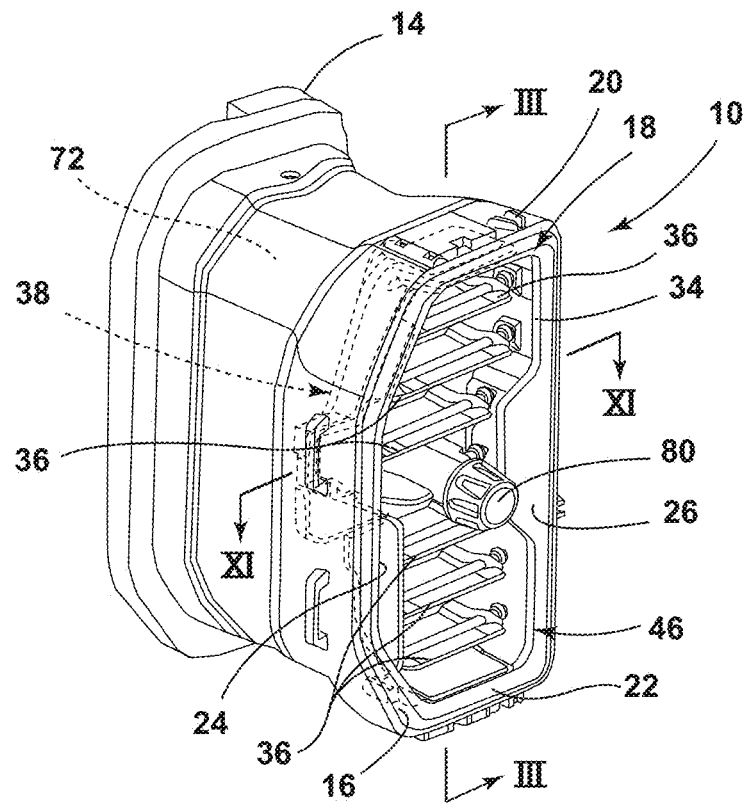
FIG. 2 is a side perspective view of an air register assembly within a housing, according to the present disclosure.
Figure 3:
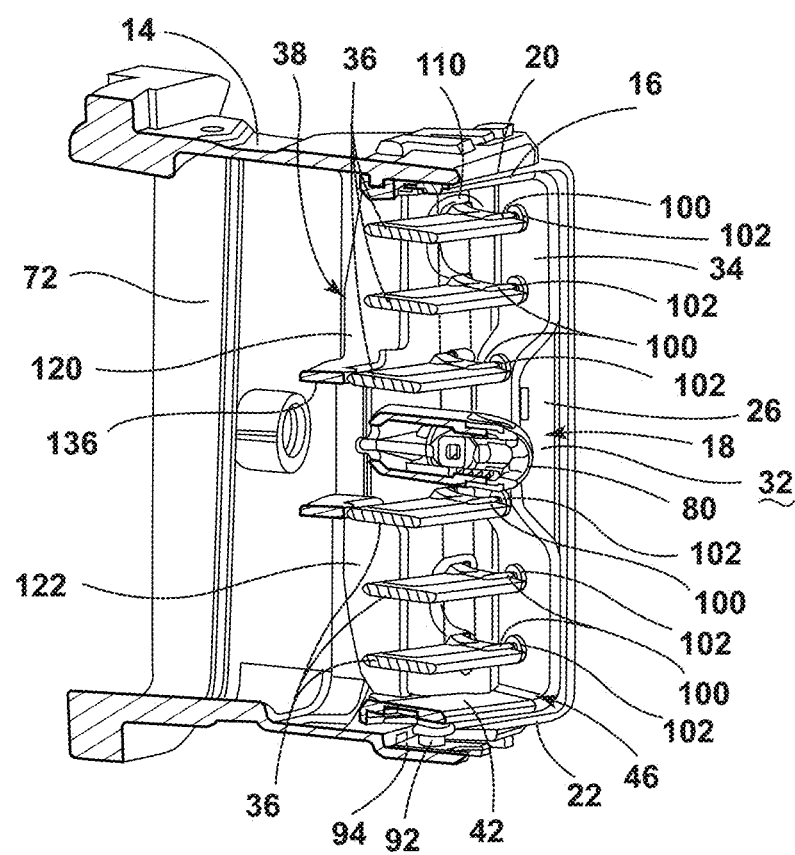
FIG. 3 is a perspective cross-sectional view of the air register assembly of FIG. 2, taken along line III-III.

Referring to FIGS. 2 and 3, the air register assembly 10 is disposed at least partially within an interior 72 of the housing 14 proximate the outlet 16. The housing 14 is configured to engage the dashboard 64 to retain the air register assemblies 10 in the selected position relative to the vent openings 66. Each air register assembly 10 is configured to pivot about a respective vertical axis within the interior 72 of the housing 14 to direct air in various cross-car directions. The outlet 16 of the housing 14 generally corresponds with the shape and size of the outer barrel 18, such that when the outer barrel 18 is at a center position the outer barrel 18 extends along a perimeter of the outlet 16. When the outer barrel 18 is disposed at angled positions, the outer barrel 18 may extend at least partially through the outlet 16. Accordingly, the outlet 16 may have any practicable configuration for directing air into the interior compartment 60 and allowing movement of the outer barrel 18.

The angle of the air register assembly 10, and consequently a direction of airflow extending through the air register assembly 10, may be manually adjusted by the passenger within the vehicle 12. The passenger may apply force on the outer barrel 18, the vanes 36, or a knob assembly 80 to adjust the air register assembly 10 to the desired angle. The knob assembly 80 is operably coupled to at least one vane 36. The knob assembly 80 may be utilized to adjust the position of the outer barrel 18 about the respective vertical axis and may be utilized to adjust the vanes 36 about respective horizontal rotational axes. The knob assembly 80 may be adjusted in the cross-car direction (e.g., left-and-right) to pivot the outer barrel 18 and adjust the airflow in the cross-car direction. The knob assembly 80 may also be adjusted between different angles along a vertical axis to adjust the angle of the vanes 36 and, consequently, adjust the airflow in the vertical direction. It is contemplated that the orientation of the air register assembly 10 may be adjusted such that the movement of the knob assembly 80 in the cross-car direction adjusts the vanes 36 and movement in the vertical direction adjusts the outer barrel 18 without departing from the teachings herein. Additionally or alternatively, the first and second retainers 30, 34 may include protruding portions proximate the knob assembly 80 to increase support for applied loads on the knob assembly 80 and the vanes 36.

Figure 4:
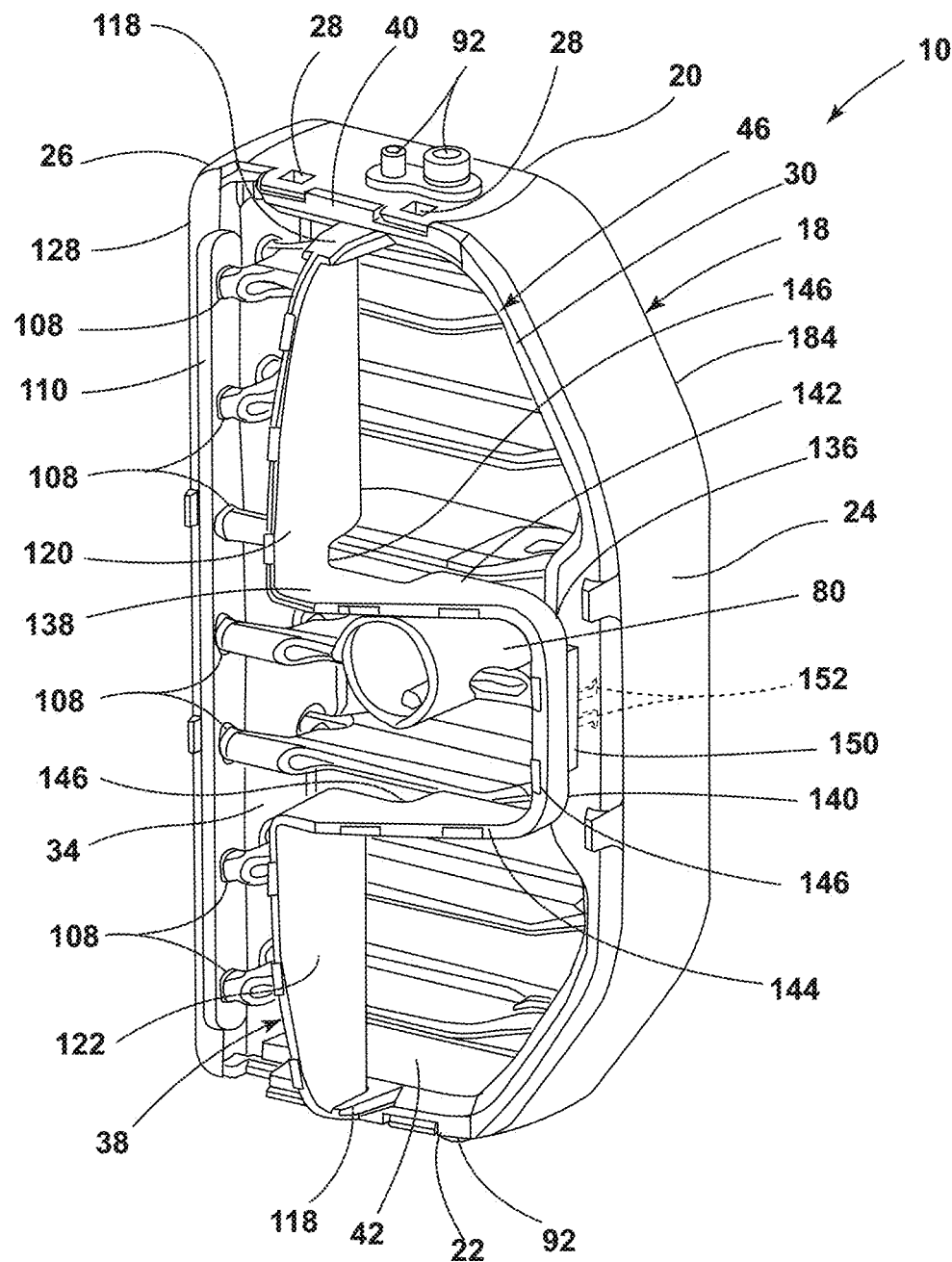
FIG. 4 is a rear perspective view of an air register assembly, according to the present disclosure.

Referring still to FIG. 3, as well as FIG. 4, the outer barrel 18 pivotally engages an interior surface of the housing 14. The outer barrel 18 defines pivot projections 92 that extend from each of the first and second sides 20, 22 to engage the interior surface of the housing 14. The pivot projections 92 extend into recessed regions 94 of the outer barrel 18. The recessed regions 94 operate to retain the pivot projections 92 while the outer barrel 18 pivots between different angled positions.

Figure 5:
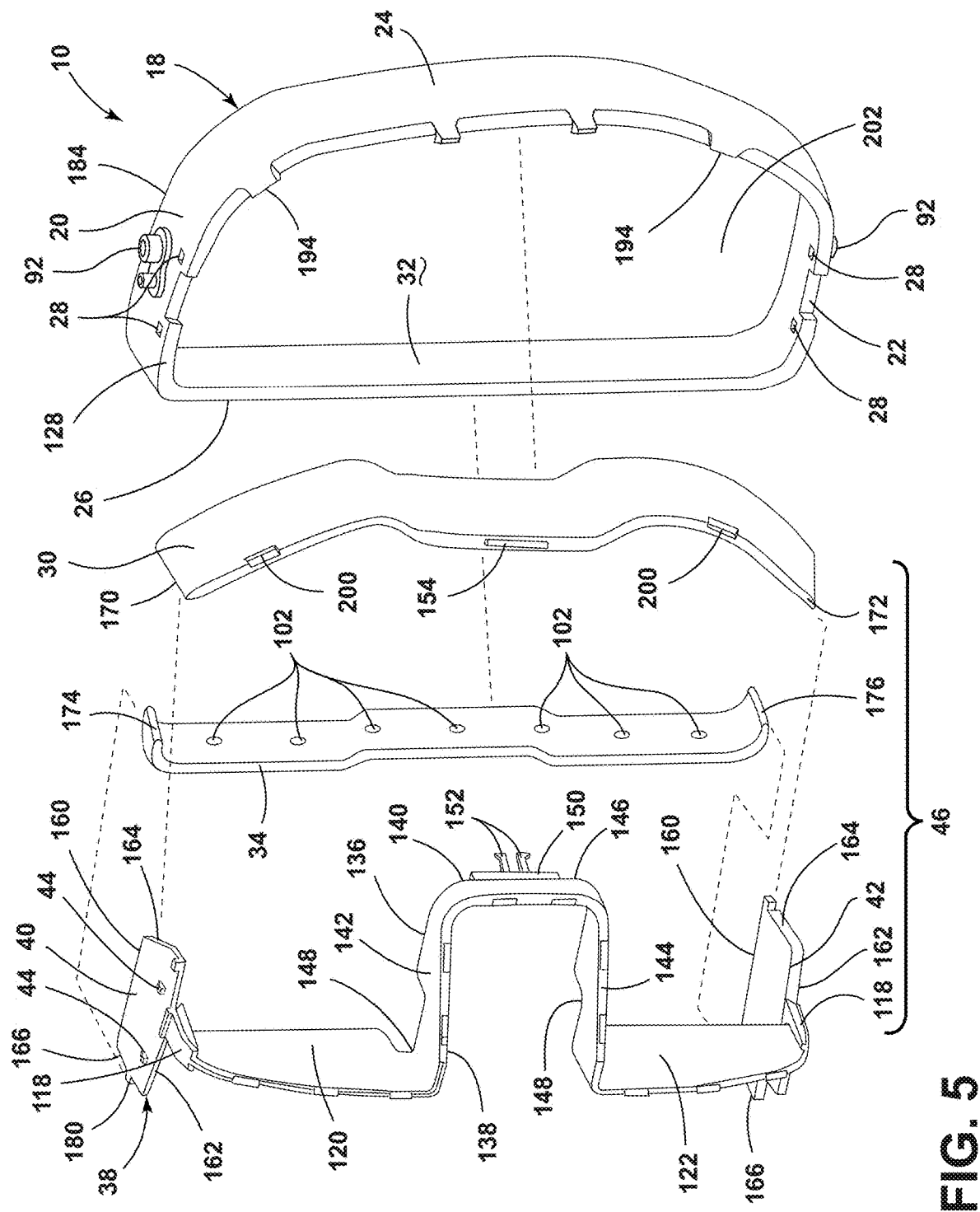
FIG. 5 is a perspective exploded view of a support feature, retainers, and a barrel of an air register assembly, according to the present disclosure.

Referring still to FIG. 4, as well as FIG. 5, the outer barrel 18 has an elongated shape with a greater longitudinal extent than lateral extent. In the illustrated configuration, the outer barrel 18 has a substantially reversed "D"-shape where the fourth side 26 is a generally linear and the third side 24 is rounded, having a center portion extending between upper and lower angled portions. However, the outer barrel 18 may define any practicable configuration for engaging the housing 14.

The air register assembly 10 includes the first retainer 30 spaced from the second retainer 34. The first retainer 30 is disposed adjacent to the third side 24 of the outer barrel 18, and the second retainer 34 is disposed adjacent to the fourth side 26 of the outer barrel 18. The shapes of the first and second retainers 30, 34 generally correspond with the shapes of the third and fourth sides 24, 26 of the outer barrel 18. Accordingly, the first retainer 30 may have a generally rounded shape that corresponds with the rounded shape of the third side 24 and the second retainer 34 may have a generally linear shape that corresponds with the shape of the fourth side 26. The first and second retainers 30, 34 extend along the inner surface 32 of the outer barrel 18 to maximize airflow through the air register assembly 10.

The vanes 36 extend between and are pivotally coupled to the first and second retainers 30, 34. The vanes 36 are generally arranged spaced apart at equidistant intervals from the first side 20 of the outer barrel 18 to the second side 22. Each vane 36 includes pivot members 100 that engage apertures 102 defined in each of the first and second retainers 30, 34. Generally, the apertures 102 defined in the first retainer 30 are horizontally aligned with the apertures 102 defined in the second retainer 34 to define the substantially horizontal rotational axis for each of the vanes 36, respectively. Each vane 36 pivots about the respective horizontal rotational axis to direct air to different vertical locations in the interior compartment 60.

Referring still to FIGS. 4 and 5, each vane 36 additionally includes a linking projection 108 that extends from an upstream edge of the respective vane 36 proximate the second retainer 34. Accordingly, each vane 36 is generally asymmetrical. Each linking projection 108 engages a link bar 110 that extends adjacent to the second retainer 34. The link bar 110 operates to couple each of the vanes 36 to allow simultaneous pivoting of the vanes 36. The link bar 110 is generally disposed upstream of and adjacent to the second retainer 34. It is contemplated that the linking projection 108 may the disposed proximate the first retainer 30 without departing from the teachings herein.

The knob assembly 80 is generally coupled to a centrally located vane 36. The knob assembly 80 provides a grasping location for the passenger within the vehicle 12 to adjust the angle of the vanes 36, the outer barrel 18, or a combination thereof. Accordingly, the passenger can adjust or move the knob assembly 80, which, consequently, adjusts the central vane 36 directly coupled to the knob assembly 80. The vane 36 coupled with the knob assembly 80 rotates about the respective horizontal rotational axis that extends between the first and second retainers 30, 34. Rotation of the central vane 36 causes the position of the link bar 110 to be vertically adjusted, which then adjusts the remaining vanes 36 via the connections between the linking projections 108 and the link bar 110. Accordingly, the manipulation of the knob assembly 80 adjusts the link bar 110, which simultaneously adjusts each vane 36 coupled with the link bar 110.

Figure 6:
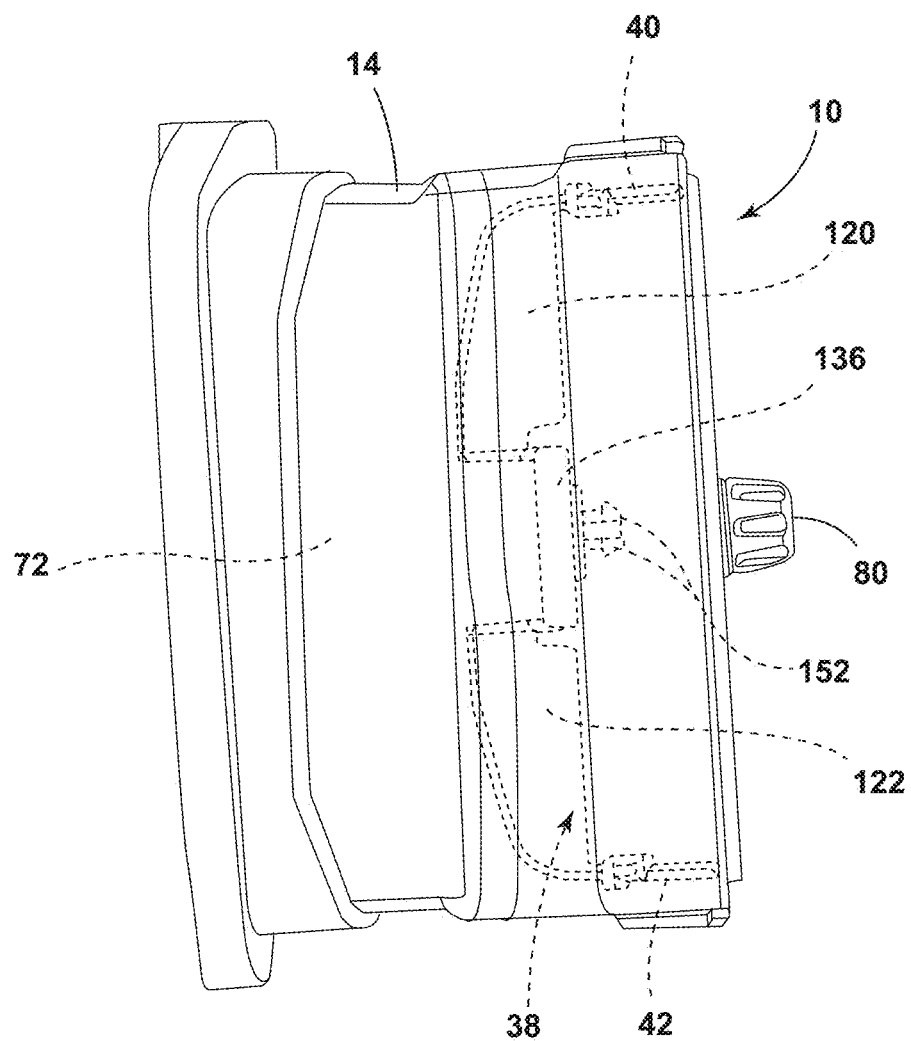
FIG. 6 is a side elevation view of a housing with an air register assembly, according to the present disclosure.

Referring still to FIGS. 4 and 5, as well as FIG. 6, the air register assembly 10 includes the support feature 38 extending between the first and second sides 20, 22 of the outer barrel 18. The support feature 38 is generally disposed upstream of the vanes 36 within the interior 72 of the housing 14. The support feature 38 operates to provide additional support to the air register assembly 10 in response to the applied loads on the knob assembly 80 or the vanes 36 by the passenger when adjusting the position of the vanes 36 or the outer barrel 18.

The support feature 38 includes the first connector 40 that engages the first side 20 of the outer barrel 18 and the second connector 42 that engages the second side 22 of the outer barrel 18. Generally, the first and second connectors 40, 42 are vertically aligned with the vanes 36. A protrusion 118 extends in an upstream direction from each of the first and second connectors 40, 42. A first vane member 120 of the support feature 38 extends from protrusion 118 adjacent to the first connector 40, and a second vane member 122 extends from the protrusion 118 adjacent to the second connector 42. The first and second vane members 120, 122 extend substantially vertical, orthogonal the vanes 36 and toward one another. Accordingly, the protrusions 118 extend upstream to allow the first and second vane members 120, 122 to extend adjacent to and upstream of the vanes of 36 without substantially interfering with the pivoting of the vanes 36.

The first and second vane members 120, 122 are coupled to a linking member 136 of the support feature 38. The linking member 136 extends between the first vane member 120 and the second vane member 122, as well as between the first retainer 30 and the first and second vane members 120, 122. A first end 138 of the linking member 136 is coupled to each of the first and second vane members 120, 122, and a second end 140 of the linking number 136 is coupled to the first retainer 30.

The linking member 136 is generally U-shaped, having a first projecting portion 142 extending from the first vane member 120 and a second projecting portion 144 extending from the second vane member 122. The first projecting portion 142 is arranged generally parallel to the second projecting portion 144, and the first and second projecting portions 142, 144 extend substantially perpendicular to the first and second vane members 120, 122. A connecting portion 146 of the linking member 136 extends between the first and second projecting portions 142, 144. The connecting portions 146 is arranged generally vertical, perpendicular to the first and second projecting portions 142, 144, and extends adjacent to the center portion of the first retainer 30. The linking member 136 is generally U-shaped, providing space for the knob assembly 80. Accordingly, the support feature 38 extends from the first side 20 of the outer barrel 18 to proximate a first side of the knob assembly 80, to the first retainer 30, along the first retainer 30, from the first retainer 30 to proximate a second side of the knob assembly 80, and to the second side 22 of the outer barrel 18.

Referring still to FIGS. 4-6, each of the first and second vane members 120, 122 increases in depth from an end adjacent to the protrusions 118 to an end adjacent to the linking member 136. The increased depth allows the first and second vane members 120, 122 to operate as a vertical vane that direct air based on the position of the outer barrel 18. The ends adjacent to the linking member 136 extend a greater distance from an upstream edge 128 of the outer barrel 18 than the ends adjacent to the protrusions 118. Additionally or alternatively, the first end 138 of the linking member 136 that is coupled to the first and second vane members 120, 122 extends a greater distance from the upstream edge 128 of the outer barrel 18 than the second end 140 coupled to the first retainer 30. The support feature 38 generally does not substantially interfere with the function of the vanes 36 or the knob assembly 80. A groove 148 is defined between the first vane member 120 and the first projecting portion 142, as well as between the second vane member 122 and the second projecting portion 144. The grooves 148 provide additional space for the vanes 36 and the knob assembly 80 to be adjusted by the user without interfering contact with the support feature 38.

The connecting portion 146 of the linking member 136 is disposed adjacent to the first retainer 30. In various examples, the connecting portion 146 includes a platform 150 that extends in a downstream direction from the connecting portion 146 toward an upstream edge of the first retainer 30. Hooks 152 extend from the platform 150 into an interior of the first retainer 30. Accordingly, the first retainer 30 defines at least one slot 154 for receiving the hooks 152. The hooks 152 may elastically deform inward and toward one another as the hooks 152 are inserted into the slot 154 and may bias outward when disposed within the first retainer 30 to couple the connecting portion 146 of the linking member 136 to the first retainer 30. The engagement between the linking member 136 and the first retainer 30 provides additional support to the air register assembly 10. Additionally, the engagement between the linking member 136 and the first retainer 30 assists in retaining the support feature 38 in the selected position.

Figure 7:
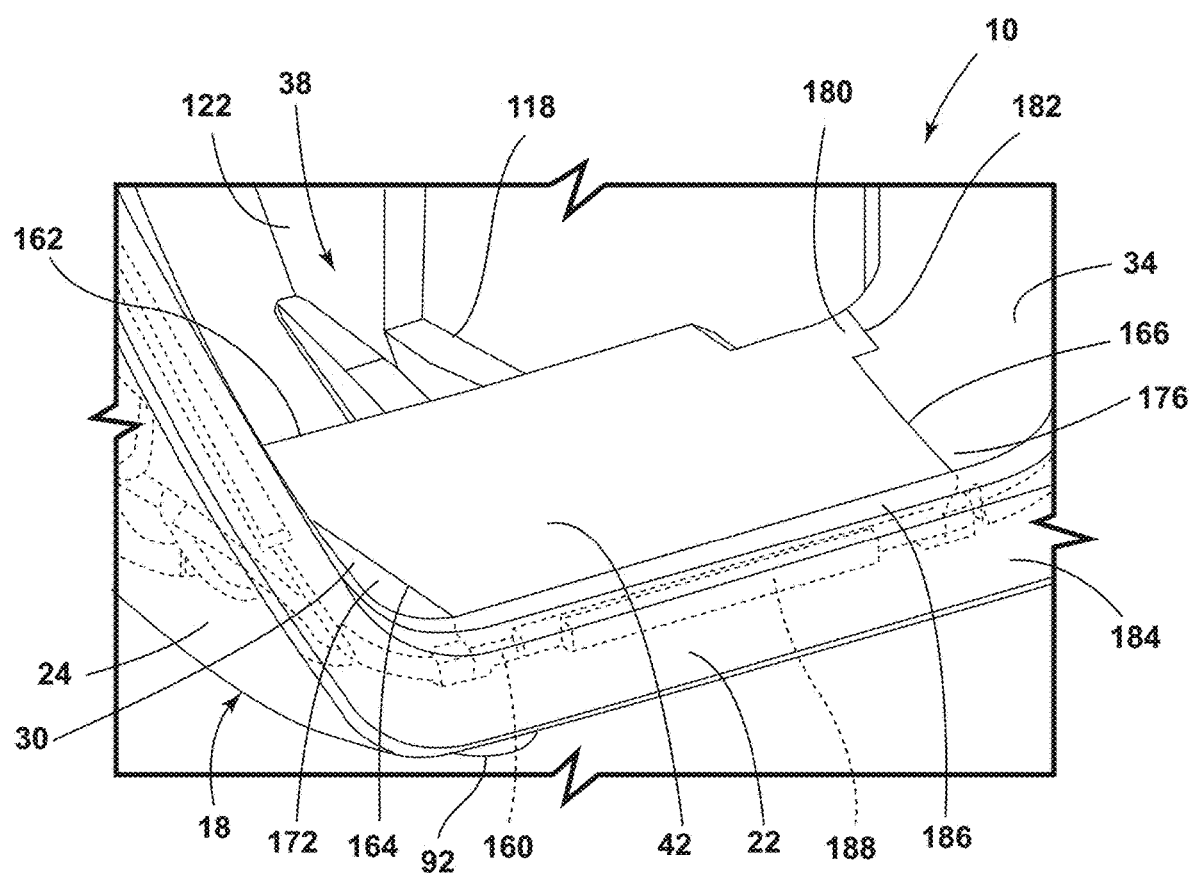
FIG. 7 is a top perspective view of a connector of a support feature engaging a retainer of an air register assembly, according to the present disclosure.
Figure 8:
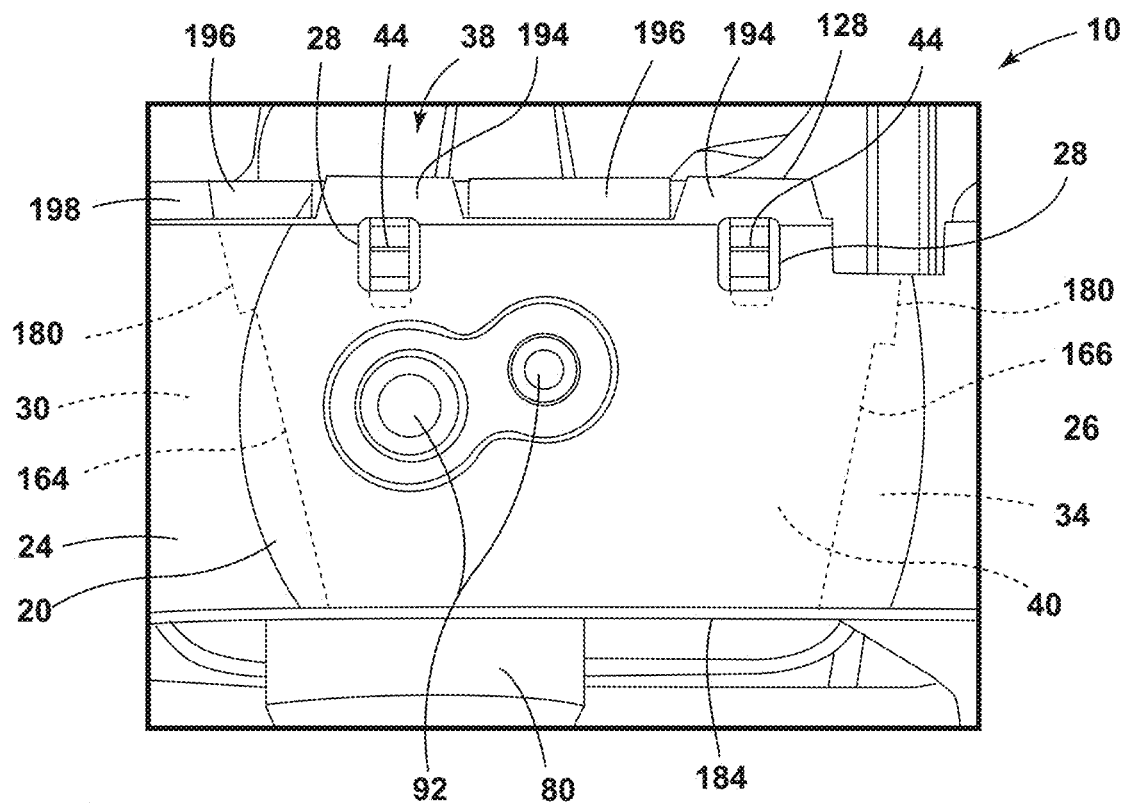
FIG. 8 is a top plan view of a support feature engaging a barrel of an air register assembly, according to the present disclosure.

Referring still to FIG. 5, as well as a FIGS. 7 and 8, the first and second connectors 40, 42 of the support feature 38 engage the first and second retainers 30, 34 to prevent movement of the first and second retainers 30, 34. Each of the first and second connectors 40, 42 includes a downstream edge 160 proximate the outlet 16 and an upstream edge 162, which couples with the protrusions 118. The downstream edge 160 generally has a width less than a width of the upstream edge 162. Due to the difference in widths, lateral edges 164, 166 of each of the first and second connectors 40, 42 extending between the upstream and downstream edges 160, 162 are angled. Accordingly, the first and second connectors 40, 42 are truncated "V"-shapes. The angled lateral edges 164, 166 and the truncated "V"-shape provide additional support for the first and second retainers 30, 34.

The first retainer 30 includes a first end 170 that engages the lateral edge 164 of the first connector 40 and a second end 172 that engages the lateral edge 164 of the second connector 42. Similarly, the second retainer 34 includes a first end 174 that engages the lateral edge 166 of the first connector 40 and a second end 176 that engages the lateral edge 166 of the second connector 42. The first ends 170, 174 of the first and second retainers 30, 34 are curved to extend partially along the first side 20 of the outer barrel 18 to engage with the first connector 40. The second ends 172, 176 of the first and second retainers 30, 34 are also curved to extend partially along the second side 22 of the outer barrel 18 to engage with the second connector 42. Each of the first and second ends 170, 172 of the first retainer 30 and the first and second ends 174, 176 of the second retainer 34 define a mating angle to mate with the respective lateral edges 164, 166 of the first and second connectors 40, 42. The angled engagements between the first and second retainers 30, 34 and the first and second connectors 40, 42 control positioning of the first and second retainers 30, 34 in the cross-car direction by pushing the first and second retainers 30, 34 against the inner surface 32 of the outer barrel 18.

Additionally, at least one of the lateral edges 164, 166 of the first and second connectors 40, 42 defines a tab 180. In examples, where each lateral edge 164, 166 defines the tab 180, the tabs 180 may be different in size or shape based on the overall configuration of the air register assembly 10. For example, as best illustrated in FIG. 8, the tab 180 extending from the lateral edge 164 is larger than the tab 180 extending from the lateral edge 166. Each of the first and second retainers 30, 34 defines at least one notch 182 for receiving the tabs 180 of the first and second connectors 40, 42. The notches 182 are sized and shaped to form an interlocking connection with the respective tab 180. The interlocking connecting provides support for retaining the first and second retainers 30, 34 in the selected position.

Additionally or alternatively, the engagement between the first and second retainers 30, 34 with the first and second connectors 40, 42 of the support feature 38 forms the inner barrel 46. The inner barrel 46 extends along the inner surface 32 of the outer barrel 18. The inner barrel 46 generally forms an A-surface of the air register assembly 10. As used herein, the term "A-surface" refers to the surface of any component within the vehicle 12 that is visible or contactable by the passenger of the vehicle 12 when the component is in an assembled state. In comparison, the term "B-surface" refers to a surface of any component within the vehicle 12 that is concealed or non-contactable by the passenger with the vehicle 12 when the component is in the assembled state. The B-surface of the inner barrel 46 generally engages the inner surface 32 of the outer barrel 18. The A-surface may be grained to provide a stylized aesthetic to the air register assembly 10, which may match other features with grained surfaces in the vehicle 12.

Each of the first and second connectors 40, 42 engage the first and second sides 20, 22 of the outer barrel 18, as well as both of the first and second retainers 30, 34. The first connector 40 extends between the first and second retainers 30, 34 adjacent the first side 20 of the outer barrel 18, and the second connector 42 extends between the first and second retainers 30, 34 adjacent the second side 22 of the outer barrel 18. The B-surface of each of the first and second connectors 40, 42 defines the snap features 44. The snap features 44 engage the apertures 28 defined by the first and second sides 20, 22 to form a snap-fit connection. The engagement between the snap features 44 and apertures 28 retains the support feature 38 in the selected position, which, consequently, retains the first and second retainers 30, 34 in the selected position through the interlocking engagement. The snap features 44 may be advantageous for securing the first and second retainers 30, 34 in the fore-aft direction. The various engagements between the support feature 38, the first and second retainers 30, 34, and the outer barrel 18 retain the various components in the selected positions and generally minimizes or prevents movement in the cross-car, vertical, and fore-aft directions (e.g., in x-, y-, and z-directions).

As best illustrated in FIG. 7, a downstream edge 184 of the outer barrel 18 defines a rim 186 that may substantially obscure the downstream edge 160 of the first and second connectors 40, 42 and downstream edges of the first and second retainers 30, 34. Accordingly, the rim 186 generally extends around a perimeter of the outer barrel 18. The downstream edge 160 of each of the first and second connectors 40, 42 defines projections 188 that extend toward the rim 186. The rim 186 may define indents to receive the projections 188 to assist in positioning and coupling with the support feature 38.

Figure 9:
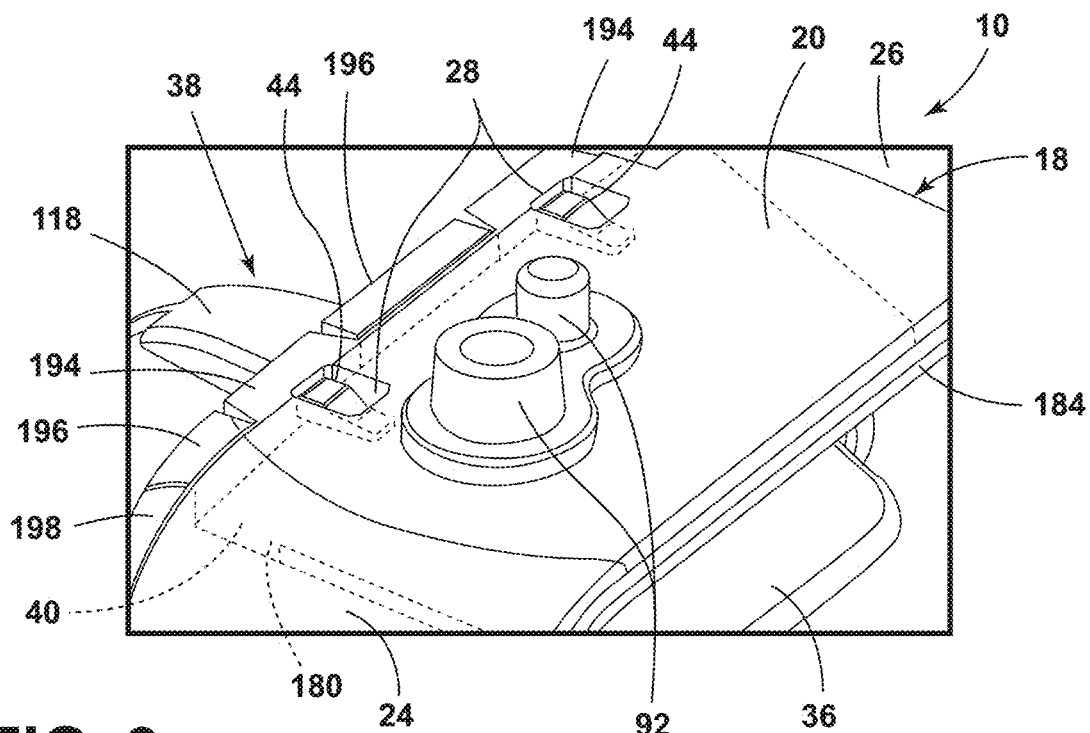
FIG. 9 is a top perspective view of a support feature engaging a barrel of an air register assembly, according to the present disclosure.
Figure 10:
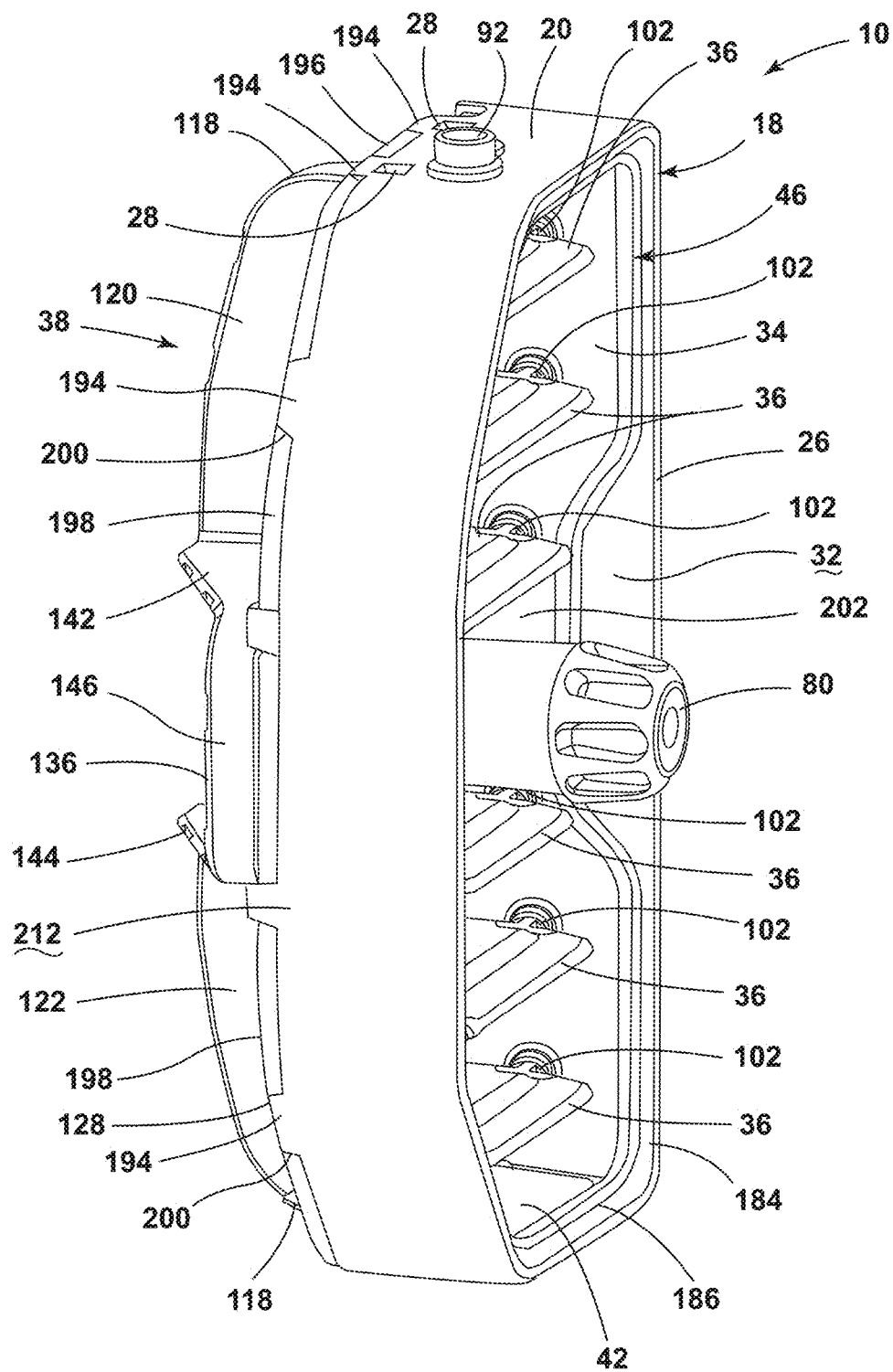
FIG. 10 is a side perspective view of an air register assembly, according to the present disclosure.

As best illustrated in FIGS. 8 and 9, as well as FIG. 10, the upstream edge 128 of the outer barrel 18 defines flanges 194 extending upstream into the interior 72 of the housing 14 (FIG. 2). The upstream edge 162 of the first and second connectors 40, 42 define projections 196. The projections 196 generally extend vertically toward the outer barrel 18. The flanges 194 are spaced apart and the projections 196 are disposed within the spaces between adjacent flanges 194. The flanges 194 may be defined on the first and second sides 20, 22 as well as the third and fourth sides 24, 26.

Additionally or alternatively, each of the first and second retainers 30, 34 includes an upstream rim 198. The rims 198 may define spaces or indents 200 spaced apart along a length thereof. The flanges 194 of the outer barrel 18 may be disposed within the indents 200 of the rims 198. Accordingly, the projections 196 of the support feature 38, the flanges 194 of the outer barrel 18, and the rims 198 of the first and second retainers 30, 34 form a continuous rim or ridge around the upstream edge of the air register assembly 10. Additionally, the alternating arrangement of the projections 196, the flanges 194, and the rims 198 with the indents 200 may assist in aligning and retaining the various components in the selected positions.

Referring still to FIG. 10, as previously stated, the first and second retainers 30, 34 are disposed adjacent to the third and fourth sides 24, 26 of the outer barrel 18. The first and second retainers 30, 34, with the first and second connectors 40, 42 of the support feature 38, define the inner barrel 46 extending along the inner surface 32 of the outer barrel 18. The knob assembly 80 extends downstream relative to the downstream edge 184 of the outer barrel 18 to provide a grasping location for the passenger to adjust the air register assembly 10. The outer barrel 18 defines an inner space 202 for the vanes of 36. The support feature 38 is disposed substantially outside the inner space 202, generally upstream of the vanes 36. Accordingly, the support feature 38 extends beyond the upstream edge 128 of the outer barrel 18. The support feature 38 provides a guide for airflow traveling through the air register assembly 10, while supporting the air register assembly 10 and positioning the first and second retainers 30, 34.

Figure 11:
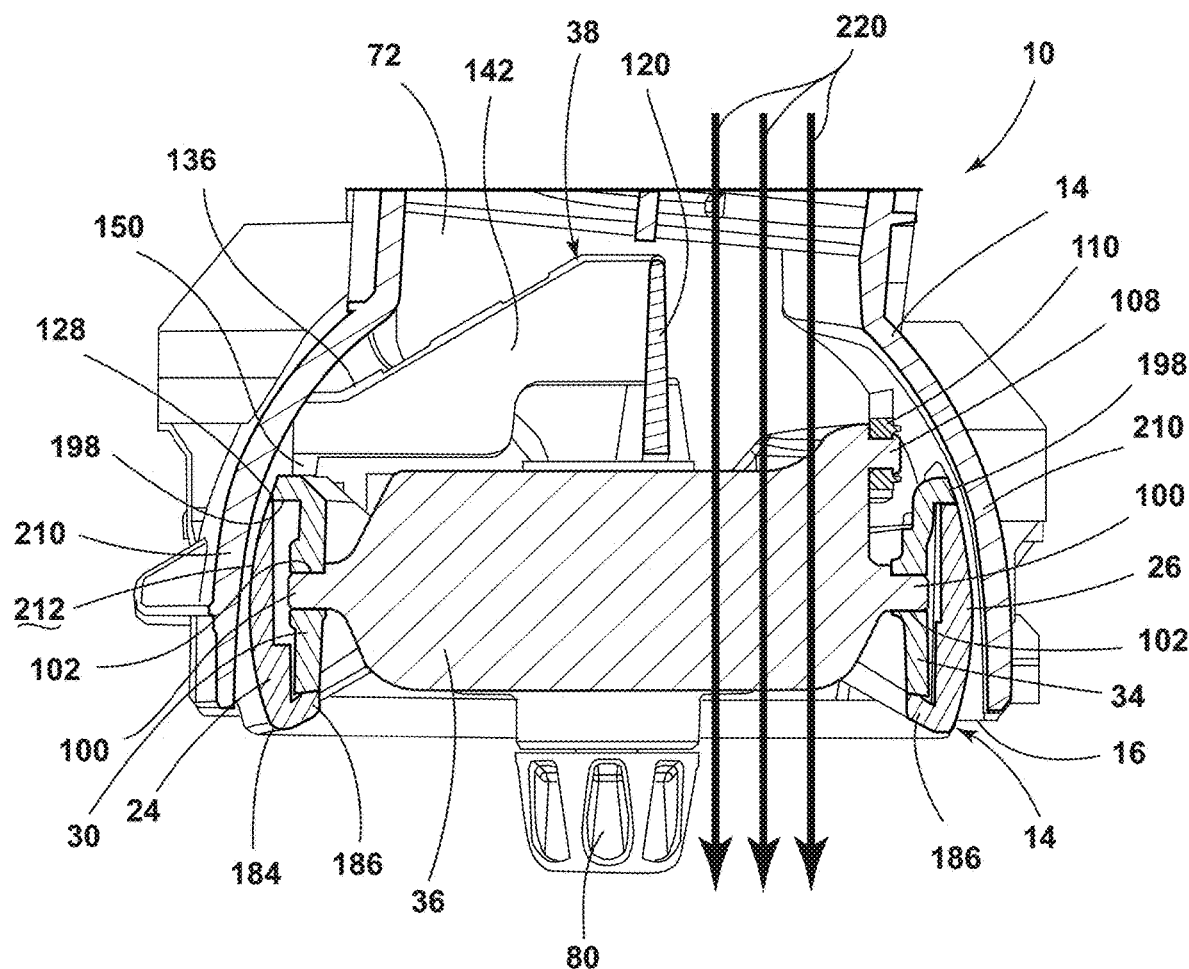
FIG. 11 is a cross-sectional view of the air register assembly within the housing of FIG. 2, taken along line XI-XI.
Figure 12:
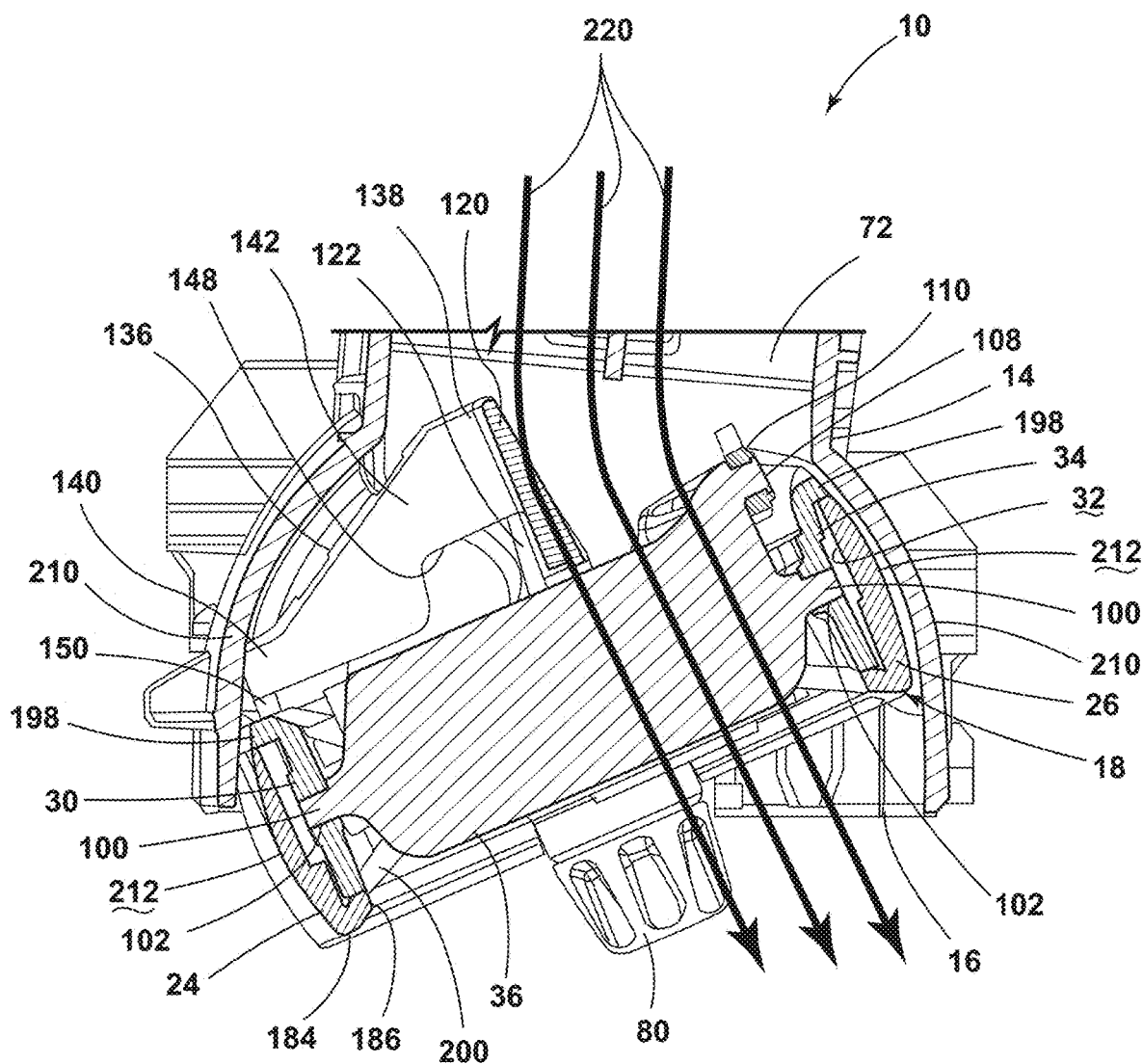
FIG. 12 is a cross-sectional view of the air register assembly of FIG. 11, with the air register assembly at an angled position within the housing.

Referring to FIGS. 11 and 12, the housing 14 generally has curved sidewalls 210 that at least partially define the outlet 16. The curved sidewalls 210 define a space for accommodating movement of the air register assembly 10 within the housing 14. The greatest width of the curved sidewalls 210 may be adjacent to the outlet 16, with the width decreasing as the curved sidewalls 210 extend upstream. An outer surface 212 of the outer barrel 18 is generally curved to allow the air register assembly 10 to move along the curved sidewalls 210 as the air register assembly 10 rotates between the central position illustrated in FIG. 11 and angled positions, one of which is illustrated in FIG. 12. The rims 198 of the first and second retainers 30, 34 form a continuous curved surface with the outer surface 212 of the outer barrel 18.

The first and second vane members 120, 122 are disposed upstream relative upstream edge 128 of the outer barrel 18 and within the interior 72 of the housing 14. The first and second vane members 120, 122 operate as a vertical vane, which directs airflow as illustrated by arrows 220 in FIGS. 11 and 12. Additionally or alternatively, the linking member 136 of the support feature 38 is configured to minimize interference between the support feature 38 and the curved sidewalls 210 as the air register assembly 10 rotates within the housing 14. The second end 140 is moved adjacent to the curved sidewall 210 as the air register assembly 10 rotates. The first end 138 of the linking member 136 coupled to the first and second vane member 120, 122 is disposed a greater distance into the interior 72 of the housing 14 relative to the second end 140 of the linking member 136 that is engaged with the first retainer 30. The different distances of the linking member 136 may minimize or prevent interference of the linking member 136 with the curved sidewalls 210 as the air register assembly 10 is rotated.

Use of the present device may provide for a variety of advantages. For example, the support feature 38 provides additional support for the air register assembly 10. Additionally, the support feature 38 includes truncated "V"-shaped first and second connectors 40, 42 that engage the first and second retainers 30, 34 to retain the first and second retainers 30, 34 in the selected position. Further, the first and second connectors 40, 42 minimize movement of the first and second retainers 30, 34 in at least the cross-car direction and the fore-aft direction. Also, the first and second connectors 40, 42 are snap-engaged with the first and second sides 20, 22 of the outer barrel 18 to provide additional support, as well as retain the first and second retainers 30, 34 in the selected position. Moreover, the linking member 136 of the support feature 38 couples with the first retainer 30 to provide additional engagement and support for the air register assembly 10. Further, the support feature 38 includes the first and second vane members 120, 122 that operate as a vertical vane to direct the airflow in a selected direction. Additionally, the linking member 136 of the support feature 38 is generally U-shaped to provide space for the knob assembly 80 to be adjusted. Additional benefits or advantages of using this device may also be realized and/or achieved.

According to various examples, a vehicle air register assembly includes a housing defining an outlet. An outer barrel is operably coupled to the housing proximate the outlet. The outer barrel includes first and second sides extending between third and fourth sides. Each of the first and second sides defines an aperture. A first retainer is disposed adjacent to an inner surface of the third side of the outer barrel. A second retainer is disposed adjacent to the inner surface of the fourth side of the outer barrel. Vanes are pivotally coupled to the first and second retainers. A support feature has a first connector spaced from a second connector. The first connector includes a snap feature that engages the aperture defined by the first side of the outer barrel and the second connector includes a snap feature that engages the aperture defined by the second side of the outer barrel. Each of the first and second connectors engages the first and second retainers to define an inner barrel. Embodiments of the present disclosure may include one or a combination of the following features:

the support feature extends upstream of an upstream edge of the outer barrel and into the housing;

each of the first and second connectors includes an upstream edge and a downstream edge, wherein the downstream edge is disposed proximate the outlet, and wherein the downstream edge has a width less than a width of the upstream edge;

a tab extends from at least one lateral edge of each of the first and second connectors to engage a notch defined in at least one of the first and second retainers to form an interlocking connection;

the support feature includes a vane member extending orthogonal to the vanes;

a knob assembly operably coupled to at least one of the vanes, wherein the support feature includes a linking member disposed adjacent to the knob assembly; and the linking member is U-shaped and defines a space for the knob assembly, and wherein a portion of the linking member is disposed proximate the first retainer.

According to various examples, an air register assembly includes a barrel having first and second sides extending between third and fourth sides. A first retainer is disposed adjacent to the third side. A second retainer is disposed adjacent to the fourth side. Vanes extend between the first and second retainers. A knob assembly is operably coupled to at least one of the vanes, and a support feature extends between the first and second sides. The support feature includes a first connector extending between the first and second retainers adjacent to the first side of the barrel and a second connector extending between the first and second retainers adjacent to the second side of the barrel. The support feature includes a U-shaped linking member disposed proximate the knob assembly. Embodiments of the present disclosure may include one or a combination of the following features:

the support feature includes a first vane member extending from the first connector to the U-shaped linking member and a second vane member extending from the second connector to the U-shaped linking member;

the barrel defines a space for the vanes, and wherein each of the first and second vane members is disposed at least partially outside of the space and adjacent to the vanes;

each of the first and second sides of the barrel defines an aperture, and wherein each of the first and second connectors includes a snap feature for engaging the respective aperture;

each of the first and second connectors includes a first edge and a second edge, wherein the first edge has a width less than a width of the second edge, and wherein lateral edges extending between the first edge and the second edge are angled;

each end of the first and second retainers defines a mating angle to mate with the lateral edges of the first and second connectors;

at least one lateral edge of each of the first and second connectors defines a tab to engage a notch defined in at least one of the first and second retainers; and the U-shaped linking member includes a connecting portion extending between first and second projecting portions, and wherein the connecting portion is disposed adjacent to the first retainer.

According to various examples, an air register assembly includes a barrel having first and second sides extending between third and fourth sides. A first retainer is disposed adjacent to the third side. A second retainer is disposed adjacent to the fourth side. A support feature extends between the first and second sides of the barrel. The support feature includes a first connector that engages the first side of the barrel and a second connector that engages the second side of the barrel. The support feature includes a first vane member extending from the first connector, a second vane member extending from the second connector and toward the first vane member, and a linking member extending between the first and second vane members. Embodiments of the present disclosure may include one or a combination of the following features:

the first connector includes a snap feature for engaging an aperture defined by the first side of the barrel, wherein the first connector engages the first and second retainers, wherein the second connector includes a snap feature for engaging an aperture defined by the second side of the barrel, and wherein the second connector engages the first and second retainers;

the linking member is U-shaped and includes a connecting portion extending between first and second projecting portions;

each of the first and second projecting portions at least partially defines a groove to define a space for vanes extending between the first and second retainers; and the linking member includes a first end adjacent to the first and second vane members and a second end adjacent to the first retainer, and wherein the first end extends a greater distance from the barrel relative to the second end.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air register assembly, comprising:
   a housing defining an outlet;
   an outer barrel operably coupled to the housing proximate the outlet, wherein the outer barrel includes first and second sides extending between third and fourth sides, and wherein each of the first and second sides defines an aperture;
   a first retainer disposed adjacent to an inner surface of the third side of the outer barrel;
   a second retainer disposed adjacent to an inner surface of the fourth side of the outer barrel;
   vanes pivotally coupled to the first and second retainers; and
   a support feature including:
      a first connector spaced from a second connector, wherein the first connector includes a snap feature that engages the aperture defined by the first side of the outer barrel and the second connector includes a snap feature that engages the aperture defined by the second side of the outer barrel, and wherein each of the first and second connectors engages the first and second retainers to define an inner barrel;
      a first vane member extending from the first connector;
      a second vane member extending from the second connector; and
      a U-shaped linking member extending between the first and second vane members.

2. The vehicle air register assembly of claim 1, wherein the support feature extends upstream of an upstream edge of the outer barrel and into the housing.

3. The vehicle air register assembly of claim 1, wherein each of the first and second connectors includes an upstream edge and a downstream edge, wherein the downstream edge is disposed proximate the outlet, and wherein the downstream edge has a width less than a width of the upstream edge.

4. The vehicle air register assembly of claim 1, wherein a tab extends from at least one lateral edge of each of the first and second connectors to engage a notch defined in at least one of the first and second retainers to form an interlocking connection.

5. The vehicle air register assembly of claim 1, wherein the first vane member and the second vane member extend orthogonal to the vanes.

6. The vehicle air register assembly of claim 1, further comprising:
   a knob assembly operably coupled to at least one of the vanes, wherein the U-shaped linking member is disposed adjacent to the knob assembly.

7. The vehicle air register assembly of claim 6, wherein the U-shaped linking member defines a space for the knob assembly, and wherein a portion of the U-shaped linking member is disposed proximate the first retainer.

8. An air register assembly, comprising:
   a barrel having first and second sides extending between third and fourth sides;
   a first retainer disposed adjacent to the third side;
   a second retainer disposed adjacent to the fourth side;
   vanes extending between the first and second retainers;
   a knob assembly operably coupled to at least one of the vanes; and
   a support feature extending between the first and second sides, wherein the support feature includes:
      a first connector extending between the first and second retainers adjacent to the first side of the barrel;
      a second connector extending between the first and second retainers adjacent to the second side of the barrel;
      a U-shaped linking member disposed proximate the knob assembly;
      a first vane member extending from the first connector to the U-shaped linking member; and
      a second vane member extending from the second connector to the U-shaped linking member.

9. The air register assembly of claim 8, wherein the barrel defines a space for the vanes, and wherein each of the first and second vane members is disposed at least partially outside of the space for the vanes and adjacent to the vanes.

10. The air register assembly of claim 8, wherein each of the first and second sides of the barrel defines an aperture, and wherein each of the first and second connectors includes a snap feature for engaging the respective aperture.

11. The air register assembly of claim 8, wherein each of the first and second connectors includes a first edge and a second edge, wherein the first edge has a width less than a width of the second edge, and wherein lateral edges extending between the first edge and the second edge are angled.

12. The air register assembly of claim 11, wherein each end of the first and second retainers defines a mating angle to mate with the lateral edges of the first and second connectors.

13. The air register assembly of claim 8, wherein at least one lateral edge of each of the first and second connectors defines a tab to engage a notch defined in at least one of the first and second retainers.

14. The air register assembly of claim 8, wherein the U-shaped linking member includes a connecting portion extending between first and second projecting portions, and wherein the connecting portion is disposed adjacent to the first retainer.

15. An air register assembly, comprising:
   a barrel having first and second sides extending between third and fourth sides;
   a first retainer disposed adjacent to the third side;
   a second retainer disposed adjacent to the fourth side; and
   a support feature extending between the first and second sides of the barrel, wherein the support feature includes:
      a first connector engaging the first side of the barrel;
      a first vane member extending from the first connector;
      a second connector engaging the second side of the barrel;
      a second vane member extending from the second connector and toward the first vane member; and
      a linking member extending between the first and second vane members, wherein the linking member is U-shaped and includes a connecting portion extending between first and second projecting portions.

16. The air register assembly of claim 15, wherein the first connector includes a snap feature for engaging an aperture defined by the first side of the barrel, wherein the first connector engages the first and second retainers, wherein the second connector includes a snap feature for engaging an aperture defined by the second side of the barrel, and wherein the second connector engages the first and second retainers.

17. The air register assembly of claim 15, wherein each of the first and second projecting portions at least partially defines a groove to define a space for the vanes extending between the first and second retainers.

18. The air register assembly of claim 15, wherein the linking member includes a first end adjacent to the first and second vane members and a second end adjacent to the first retainer, and wherein the first end extends a greater distance from the barrel relative to the second end.

* * * * *